US012783272B2

(12) United States Patent
Hier et al.

(10) Patent No.: US 12,783,272 B2
(45) Date of Patent: Nov. 3, 2026

(54) COORDINATED MAINTENANCE FOR VIRTUAL MACHINE (VM) CLUSTERS/PODS

(71) Applicant: Google LLC, Mountain View, CA (US)

(72) Inventors: Isaac Hier, Seattle, WA (US); Pingpan Cheng, Seattle, WA (US); Dmitry Eric Shiraev, Seattle, WA (US); Pavel A Dournov, Bellevue, WA (US); Diwakar Gupta, Seattle, WA (US)

(73) Assignee: Google LLC, Mountain View, CA (US)

( * ) Notice: Subject to any disclaimer, the term of this patent is extended or adjusted under 35 U.S.C. 154(b) by 872 days.

(21) Appl. No.: 17/883,056

(22) Filed: Aug. 8, 2022

(65) Prior Publication Data

US 2024/0045708 A1 Feb. 8, 2024

(51) Int. Cl.
*G06F 9/455* (2018.01)
*G06F 9/54* (2006.01)

(52) U.S. Cl.
CPC ...... *G06F 9/45558* (2013.01); *G06F 9/45545* (2013.01); *G06F 9/541* (2013.01); *G06F 2009/4557* (2013.01)

(58) Field of Classification Search
CPC .. G06F 9/45558; G06F 9/45545; G06F 9/541; G06F 2009/4557; G06F 9/5077; G06F 9/5072
See application file for complete search history.

(56) References Cited

U.S. PATENT DOCUMENTS

| | | | | |
|---|---|---|---|---|
| 10,853,111 | B1 * | 12/2020 | Gupta | G06F 9/45558 |
| 10,972,353 | B1 * | 4/2021 | Sangra | H04L 43/067 |
| 11,354,150 | B1 * | 6/2022 | Guo | H04L 41/082 |
| 11,494,217 | B1 * | 11/2022 | Krasilnikov | G06F 9/45558 |
| 2012/0030669 | A1 * | 2/2012 | Tsirkin | G06F 9/45558 718/1 |
| 2013/0155083 | A1 * | 6/2013 | McKenzie | G06F 9/45558 345/522 |
| 2013/0191543 | A1 * | 7/2013 | Abbondanzio | H04L 47/70 709/226 |
| 2017/0039082 | A1 * | 2/2017 | Ganesan | G06F 9/45558 |
| 2019/0065235 | A1 * | 2/2019 | Higuchi | G06F 9/45558 |
| 2019/0324865 | A1 * | 10/2019 | Weissman | G06F 11/1471 |

(Continued)

OTHER PUBLICATIONS

Invitation to Pay Additional Fees and Partial International Search for PCT Application No. PCT/US2023/028533 dated Oct. 20, 2023. 14 pages.

(Continued)

*Primary Examiner* — Pierre Vital
*Assistant Examiner* — Tuan M Nguyen
(74) *Attorney, Agent, or Firm* — Lerner David LLP

(57) ABSTRACT

In a cloud computing system, groups of virtual machines include within one or more pods interacting with one another. A set of hosts is dedicated to operation of the virtual machines in each pod, and such dedication persists during routine maintenance operations when one or more virtual machines is uninstalled. The pod and the hosts can be scheduled for maintenance during a single interval. The cloud computing system may notify the owner of the virtual machines in advance of the interval, and may allow the owner of the virtual machines to either reschedule the maintenance of the pod and hosts in a single interval, or to schedule maintenance for each virtual machine in a separate interval.

10 Claims, 7 Drawing Sheets

(56) References Cited

U.S. PATENT DOCUMENTS

| | | | |
|---|---|---|---|
| 2020/0142732 A1* | 5/2020 | Okuno ................ | G06F 9/45558 |
| 2022/0035662 A1 | 2/2022 | Wiggers et al. | |
| 2022/0075613 A1* | 3/2022 | Ramachandran ... | G06F 9/45558 |
| 2023/0350733 A1* | 11/2023 | Muthukrishnan ..... | G06F 9/5044 |

OTHER PUBLICATIONS

International Search Report and Written Opinion for International Application No. PCT/US2023/028533 dated Dec. 11, 2023. 18 pages.

* cited by examiner

COORDINATED MAINTENANCE FOR VIRTUAL MACHINE (VM) CLUSTERS/PODS

BACKGROUND

The disclosed technology relates to computer systems which operate virtual machines installed in hosts. Such systems are commonly referred to as "cloud computing" systems. A "virtual machine" ("VM") is a computing resource which includes a software element which, when installed in hardware, provides an interface which allows application programs to run. A "host" is a particular assemblage of hardware elements and may also include a software element referred to a "host kernel" installed in the hardware. The cloud computing system typically also includes elements such as storage and a network allowing communications between virtual machines installed in different hosts. Typically, multiple users, referred to herein as "customers," specify different virtual machines, which may be operative at different times. The cloud computing system typically includes software referred to herein as "supervisory software" which performs tasks such as locating vacant hosts which can accommodate virtual machines and performing maintenance operations on the virtual machines and hosts.

In a typical cloud computing system, the supervisory software selects hosts for maintenance at particular times which bear no relation to the particular virtual machines operating in the hosts. Thus, the hosts running virtual machines owned by a given customer may undergo host maintenance at times which the customer cannot predict. For many types of virtual machines used heretofore, this does not pose a significant problem because many virtual machines can be uninstalled and reinstalled in new hosts with data allowing the reinstalled virtual machine to pick up the operations with little or no disruption.

However, some virtual machines such as the graphics processing units ("GPU") machines discussed below, generally cannot be moved or "migrated" in this manner. Moreover, a customer may specify a group of virtual machines, referred to herein as a "pod" which are intended to operate together with rapid interchange of data between virtual machines.

A pod can become inoperative or suffer significant loss of performance if one or more of the virtual machines in the pod is disabled due to maintenance. For example, over time new software typically needs to be deployed on a host or the host's hardware needs to be upgraded. The resulting effect to a customer may take the form of glitches on running instances to requiring rerunning of large scale computations (e.g., large-scale distributed machine learning applications).

To mitigate against such effects, one current approach provides customers 7 days advance notice of an upcoming maintenance disruption for a particular virtual machine.

BRIEF SUMMARY

In one aspect, the disclosed technology provides a mechanism for scheduling maintenance across a pod such that all maintenance disruptions associated with the pod occur within a predetermined time period, i.e., no individual VM of a pod is disrupted outside of the scheduled or coordinated maintenance. In another aspect, the disclosed technology provides a mechanism that allows customers to trigger maintenance earlier than scheduled.

For instance, the disclosed technology may be implemented as a method for performing host maintenance in a cloud computing network, comprising sending a request to a computing device through an application programming interface (API), the request including a field that indicates a maintenance event can be triggered by a user and associated with a predetermined time period during which maintenance can take place; receiving a response from the computing device including a selected time within the predetermined time period, the selected time indicating when to schedule the maintenance event for a plurality of virtual machines associated with a pod; and triggering the maintenance event for each of the plurality of virtual machines at the selected time. In accordance with this aspect of the disclosed technology, receiving the selected time comprises receiving the selected time in response to a customer selection. In accordance with this aspect of the disclosed technology, triggering the maintenance event comprises terminating each of the plurality virtual machines running on one or more host machines associated with the pod, upgrading the one or more host machines, rescheduling instantiation of the plurality of virtual machines on a given one of the one or more host machines after upgrading is completed for a given one of the plurality of host machines. The method may also comprise iteratively performing terminating, upgrading, and rescheduling until each of the plurality of virtual machines is instantiated on an upgraded host machine.

Further in accordance with the method, the plurality of virtual machines resides on one or more host machines associated with the pod. The pod may comprise a GPU pod. Further, the API comprises a pod-level API that triggers maintenance for an entire GPU pod with a single API call. In addition, the API may comprise a VM-level API that individually triggers maintenance for each of the plurality of virtual machines. The method may also comprise receiving a request to associate the plurality of virtual machines as a group based on a time to schedule the maintenance event.

The disclosed technology may also be implemented as a method of operating a cloud computing system incorporating a plurality of hosts and a supervisory computer, the method comprising causing the supervisory computer to: (a) maintain a record of virtual machines owned by customers, the virtual machines specified by the customers including a plurality of virtual machines owned by a first customer and constituting a pod, the virtual machines of the pod being installed in a set of hosts; (b) schedule a maintenance interval for performing a group of maintenance operations on at least some of the virtual machines in the pod, at least some of the hosts in the set, or both, the scheduled maintenance interval having an original start time; (c) notify the first customer before the original start time of the scheduled maintenance interval; and (d) receive maintenance commands sent by the first customer responsive to the notification. In addition, (i) when the received maintenance commands consist of a single pod-level maintenance command specifying the pod and a time earlier than the original start time, perform all of the group of maintenance operations in an interval commencing at the time specified in the pod-level maintenance command; (ii) when received maintenance commands includes a plurality of VM-level maintenance commands, each specifying a particular VM of the pod and a specified time earlier than the original starting time, for each VM-level command perform the scheduled maintenance operations of the group for the particular VM specified, the host occupied by that VM, or both, in an interval starting and the time specified in the VM-level command; and (iii) when no maintenance command is received responsive to the notification, perform all of the group of maintenance operations in the scheduled interval. In accordance with this aspect of the disclosed technology, to notify the first customer includes sending the notification to a computing device through an application programming interface (API). Further, to notify the first customer includes sending the notification to each of the virtual machines in the pod.

The disclosed technology may also be implemented as a method of operating a cloud computing system incorporating a plurality of hosts and a supervisory computer, the method comprising causing the supervisory computer to: (a) maintain a record of virtual machines specified by customers, the virtual machines specified by the customers including a plurality of virtual machines constituting a pod, each virtual machine of the pod having a pod membership attribute denoting membership in the pod; (b) select a set of hosts including a plurality of the hosts and install each of the virtual machines in the first pod in a host in the set so that the pod is operational; (c) record a dedication attribute for each host in the set indicating that the host is dedicated to the pod; and, after steps (b) and (c), (d) initiate a maintenance interval and during the maintenance interval: (1) uninstall of one or more virtual machines of the pod from one or more of the hosts of the set so that one or more of the hosts in the set become vacant; (2) while one or more of the hosts in the set are vacant and one or more of the virtual machines of the set are uninstalled, (i) perform a maintenance operation on the vacant hosts of the set, the uninstalled virtual machines, or both; and (ii) prevent installation of any virtual machine which is not a member of the pod in any vacant host of the set by comparing a pod membership of each virtual machine proposed for installation to the dedication attribute of the host and blocking installation if the pod membership attribute of the virtual machine is null or differs from the dedication attribute of the host; and (iii) reinstall the uninstalled virtual machines in the vacated hosts of the set by selecting hosts having a dedication attribute corresponding to the pod membership attribute of the virtual machine. In accordance with the method, to initiate a maintenance interval includes initiating a maintenance interval at a time specified by a customer having ownership of the virtual machines of the pod. Further, to initiate a maintenance interval includes operating the supervisory software to notify the customer of an impending maintenance interval before a time planned for commencement of such maintenance interval and, when the customer responds with a time earlier than the time planned, rescheduling the maintenance interval to commence at the time specified in the response. The method may also comprise causing the supervisory computer to operate the supervisory software to sort the hosts into a plurality of maintenance buckets and initiate maintenance intervals for all of the hosts in a given bucket within a bucket interval associated with that bucket, the sorting step including assigning all of the hosts of the set to a single maintenance bucket. Further, the virtual machines of the pod are GPU machines and share data with one another via remote direct memory access. In addition, no virtual machines other than the virtual machines of the pod are installed in the hosts of the set. Further still, in step (a), the virtual machines include virtual machines in a plurality of pods, and virtual machines in different ones of the pods have different membership attributes, and wherein steps (b)-(d) are performed separately for different ones of the pods, so that as to form plural sets of hosts, the hosts of each set having a dedication attribute corresponding to the membership attribute of one of the pods.

The disclosed technology may also be implemented as a non-transitory computer-readable medium storing a program including instructions that, when executed by one or more processing devices, causes a supervisory computer to: (a) maintain a record of virtual machines owned by customers, the virtual machines specified by the customers including a plurality of virtual machines owned by a first customer and constituting a pod, the virtual machines of the pod being installed in a set of hosts; (b) schedule a maintenance interval for performing a group of maintenance operations on at least some of the virtual machines in the pod, at least some of the hosts in the set, or both, the scheduled maintenance interval having an original start time; (c) notify the first customer before the original start time of the scheduled maintenance interval; and (d) receive maintenance commands sent by the first customer responsive to the notification. In addition, (i) when the received maintenance commands consist of a single pod-level maintenance command specifying the pod and a time earlier than the original start time, perform all of the group of maintenance operations in an interval commencing at the time specified in the pod-level maintenance command; (ii) when received maintenance commands includes a plurality of VM-level maintenance commands, each specifying a particular VM of the pod and a specified time earlier than the original starting time, for each VM-level command, perform the scheduled maintenance operations of the group for the particular VM specified, the host occupied by that VM, or both, in an interval starting and the time specified in the VM-level command; and (iii) when no maintenance command is received responsive to the notification, perform all of the group of maintenance operations in the scheduled interval. In accordance with this aspect of the disclosed technology, to notify the first customer includes sending the notification to a computing device through an application programming interface (API). Further, to notify the first customer includes sending the notification to each of the virtual machines in the pod.

The disclosed technology may also be implemented as a non-transitory computer-readable medium storing a program including instructions that, when executed by one or more processing devices, causes a supervisory computer to: (a) maintain a record of virtual machines specified by customers, the virtual machines specified by the customers including a plurality of virtual machines constituting a pod, each virtual machine of the pod having a pod membership attribute denoting membership in the pod; (b) select a set of hosts including a plurality of the hosts and install each of the virtual machines in the first pod in a host in the set so that the pod is operational; (c) record a dedication attribute for each host in the set indicating that the host is dedicated to the pod; and, after steps (b) and (c), (d) initiate a maintenance interval and during the maintenance interval: (1) uninstall of one or more virtual machines of the pod from one or more of the hosts of the set so that one or more of the hosts in the set become vacant; (2) while one or more of the hosts in the set are vacant and one or more of the virtual machines of the set are uninstalled, (i) perform a maintenance operation on the vacant hosts of the set, the uninstalled virtual machines, or both; and (ii) prevent installation of any virtual machine which is not a member of the pod in any vacant host of the set by comparing a pod membership of each virtual machine proposed for installation to the dedication attribute of the host and blocking installation if the pod membership attribute of the virtual machine is null or differs from the dedication attribute of the host; and (iii) reinstall the uninstalled virtual machines in the vacated hosts of the set by selecting hosts having a dedication attribute corresponding to the pod membership attribute of the virtual machine. In accordance with this aspect of the disclosed technology, to initiate a maintenance interval includes initiating a maintenance interval at a time specified by a customer having ownership of the virtual machines of the pod. Further, to initiate a maintenance interval includes operating the supervisory software to notify the customer of an impending maintenance interval before a time planned for commencement of such maintenance interval and, when the customer responds with a time earlier than the time planned, rescheduling the maintenance interval to commence at the time specified in the response. The computer-readable medium may also comprise causing the supervisory computer to operate the supervisory software to sort the hosts into a plurality of maintenance buckets and initiate maintenance intervals for all of the hosts in a given bucket within a bucket interval associated with that bucket, the sorting step including assigning all of the hosts of the set to a single maintenance bucket. Further, the virtual machines of the pod are GPU machines and share data with one another via remote direct memory access. In addition, no virtual machines other than the virtual machines of the pod are installed in the hosts of the set. Further still, in step (a), the virtual machines include virtual machines in a plurality of pods, and virtual machines in different ones of the pods have different membership attributes, and wherein steps (b)-(d) are performed separately for different ones of the pods, so that as to form plural sets of hosts, the hosts of each set having a dedication attribute corresponding to the membership attribute of one of the pods.

DETAILED DESCRIPTION

Figure 1:
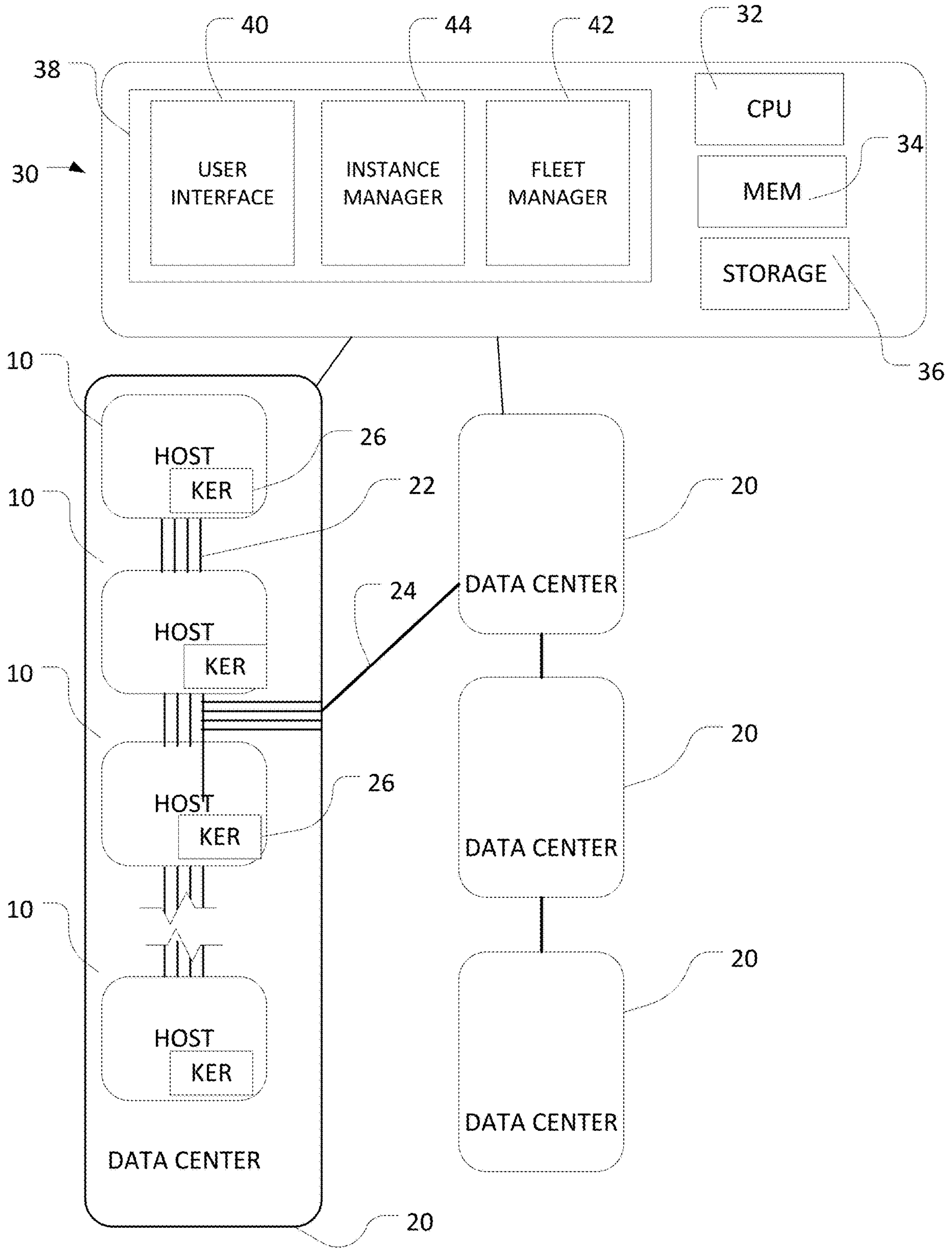
FIG. 1 is a diagrammatic depiction of a cloud computing system in accordance with an aspect of the present technology.

In one aspect, the disclosed technology provides a mechanism for scheduling maintenance across a pod such that all maintenance disruptions associated with the pod occur within a predetermined time period, i.e., no individual VM of a pod is disrupted outside of the scheduled or coordinated maintenance. In another aspect, the disclosed technology provides a mechanism that allows customers to trigger in-place maintenance earlier than scheduled.

A first feature of the disclosed technology comprises methods and systems that provides a customer with the capability to trigger host and/or VM maintenance on demand. A second feature of the disclosed technology comprises establishing placement groups (e.g., a placement group may comprise a group of VMs with a single coordinated maintenance disruption time). A third feature of the disclosed technology allows customers to add VMs to a placement group.

As an example, the disclosed technology may operate at a high level as follows. A customer may create a pod of VMs, e.g., a GPU pod. At some predetermined time before a scheduled maintenance (e.g., 28 days) notifications for the upcoming maintenance are distributed to all VMs within the pod so as to notify the customer(s) of the upcoming maintenance. The predetermined time period may be considered the notification period. The notification includes a "can_reschedule field" which indicates whether the maintenance may or may not be triggered by the customer. If the customer elects to trigger maintenance, maintenance may be triggered at a VM level or at a pod level, on a given day chosen by the customer.

In the case of VM-level triggering, maintenance is triggered for each VM within a pod on a VM-by-VM basis at a time of the customer's choosing within the notification period. This operation may take place via a VM-level API (e.g., PerformMaintenance API either through a POST request or the gcloud CLI). The API will return an "operation-id" in responding to the reschedule request. A maintenance status for each VM associated with the triggering request(s) may then be polled using the operation-id. If the maintenance operation is successful, the corresponding notification is deleted and the associated VM is tagged as not requiring maintenance for the predetermined time period (e.g., 28 days). If the maintenance operation fails, it may be reinitiated via the VM-level API. The customer may then wait for all the VMs for which maintenance was triggered to be completed.

In the case of pod-level triggering, all the VMs in a pod would be triggered for maintenance. This operation may take place via a pod-level API, which triggers maintenance for an entire pod with a single API call. In the case of the GPU pods, pod-level triggering may be more desirable for a customer given the type of applications typically running on a GPU pod. In addition, the technology may be more suited for GPU pods, since these pods are usually single tenant host applications. More specifically, in the case of pod-level triggering, the customer triggers maintenance for an entire pod (e.g., GPU pod) at a time of their choosing within a notification period through a pod-level API (e.g., PerformGPUPodMaintenance API either through a POST request or the gcloud CLI). The status of the maintenance may then be polled via a returned operation-id. If the maintenance operation succeeds, the corresponding notifications for all the VMs will be deleted and the VMs are guaranteed to not see any maintenance for the predetermined time period (e.g., next 28 days). If the maintenance operation fails, it may be reinitiated via the pod-level API.

In another aspect of the disclosed technology, the provision of placement groups allows for all VMs that require maintenance in a placement group/pod to be scheduled for maintenance at or around the same time (e.g., within a 1-2 hour window).

In another aspect of the disclosed technology, because a maintenance disruption itself will evict all VMs from a host, forcing them into the PENDING state, the PENDING VMs will be scheduled back onto the host before other VMs are given the opportunity to schedule on the machine.

One example of a cloud computing system is schematically depicted in FIG. 1. The system includes a plurality of hosts 10 which may be physically present in a plurality of data centers 20 disposed in separate locations. Only a few data centers 20 and only a few of the hosts 10 in one of the data centers are depicted in FIG. 1; in practice, a typical data center may include hundreds or thousands of hosts. Each data center 20 typically includes a local network 22 and external communications 24 which allow communication between hosts in different data centers and with external computers. The system typically includes shared resources such as storage hardware as, for example, solid state disk drives and conventional disk storage (not shown). Each host 10 includes hardware elements such as a CPU, memory, and local storage, as well as a software element referred to as a "host kernel" 26 which enables the hardware to interact with virtual machines as discussed below. Hosts 10 configurations may vary between different hardware and different kernels to provide different capabilities.

Figure 2:
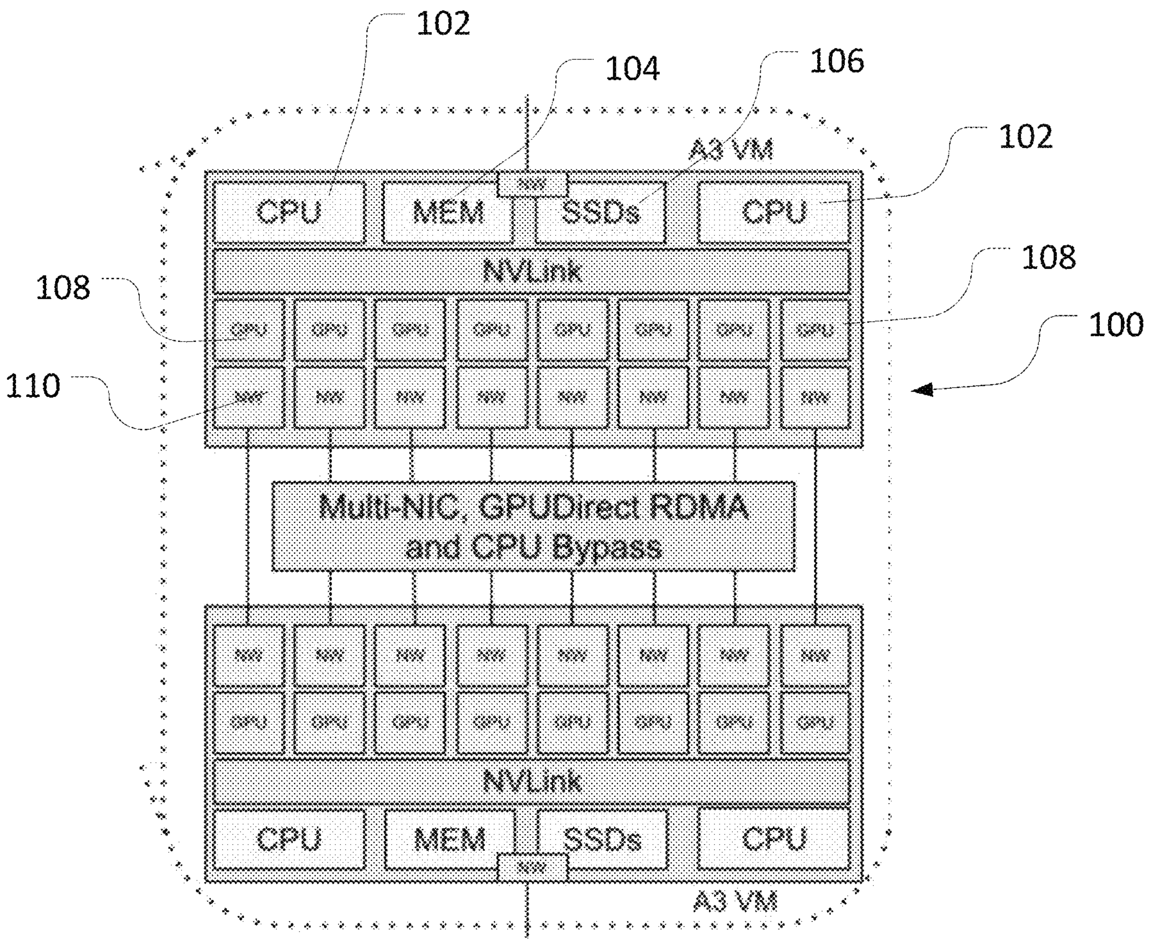
FIG. 2 is a block diagram of one type of host in accordance with an aspect of the present technology.

One example of one or more hosts 100 is shown in FIG. 2. Host 100 may, for example, be part of a GPU pod that supports one or more virtual machines that facilitate supercomputer type processing power, which enables customers for instance to run large-scale distributed machine learning and HPC workloads. The host 100 includes CPUs 102, memory 104, and local storage such as solid state drives 106, and further includes numerous graphics processing units or GPUs 108, as well as numerous network interfaces 110. A GPU is a hardware element which includes multiple processing elements which operate in parallel. Computers which use GPUs can perform tasks which require massive parallel operations, as, for example machine learning and pattern recognition. By linking a plurality of such computers together through a high-speed network using multiple network interfaces and using techniques such as remote direct memory access (RDMA) and CPU bypass which rapidly transfer data between different machines, a pod of virtual machines can provide massive parallel computing capabilities. A host of the type depicted in FIG. 2 can be referred to as a "GPU Host." Where multiple GPU hosts used to operate multiple virtual machines of a pod, it is advantageous to have all of the hosts in the same data center shown in FIG. 1, so that the hosts can communicate via a single local network 22. Other types of hosts (not shown) may also be included in the computing system.

The cloud computing system further includes a supervisory computer 30 incorporating hardware elements such as one or more processor 32, memory 34, and storage 36. Although the hardware elements of the supervisory computer are depicted separately from the other hardware elements discussed above, they may be implemented on one or more hosts 10 dedicated to this purpose. The supervisory computer system runs supervisory software 38.

Supervisory software 38 includes a user interface 40, which allows a customer to specify virtual machines, and treats the customer which specifies a virtual machine as the owner of that VM. The specification typically includes a virtual machine type and a specification for an operating system to run on the virtual machine, and may also include other components such as programs created by the customer. The user interface also allows the user to specify that particular virtual machines owned by that customer are part of a group of virtual machines referred to herein as an "affinity group" having an attribute referred to herein as an affinity group name and may further allow the customer to specify that the virtual machines in the affinity group are subject to a "placement policy." A placement policy may be a "compact" placement policy, which requires that all virtual machines in the affinity group be run on hosts in the same data center 20 or a "distributed" policy which specifies the that the virtual machines are to run on hosts in different data centers.

The supervisory software further includes a fleet manager 42 which maintains a record associated with each of the hosts 10. The record for each host includes attributes such as the location of each host, and the type of host. The record for each host also includes a status indicator. The status indicator has values which indicate whether the host is currently: (1) active, i.e., loading or operating a virtual machine; or (2) available to load and run a virtual machine, i.e., "schedulable;" or (3) undergoing maintenance. The fleet manager also schedules host-level maintenance. Host-level maintenance may include, for example, updating the host kernel 26 or hardware maintenance. The record for each host also includes an attribute referred herein as a "dedication attribute" indicating whether or not the host is dedicated to use with virtual machines belonging to a particular pod, and, if so, which pod. In this example, if a host is dedicated to use with virtual machines of a particular pod, the dedication attribute will have a value corresponding to the name of the affinity group which specifies the particular pod. If the host is not dedicated to use with any pod, the dedication indicator will be a null value Supervisory software 38 further includes an instance manager 44. Instance manager 44 maintains a record for each virtual machine which has been specified by a user, indicating whether the virtual machine is (1) active, i.e., installed in a host; or (2) waiting for installation, i.e., "pending;" or (3) temporarily uninstalled for maintenance. The instance manager also determines whether or not a given virtual machine belongs to a group of virtual machines which constitute a pod. In this example, the instance manager will treat a virtual machine as part of a pod if (a) the virtual machine type designates a virtual machine intended to operate in a GPU host and (b) the virtual machine is part of an affinity group with a compact placement policy. If both conditions are true, the instance manager treats the virtual machine as belonging to a pod and treats the affinity group name as an attribute of the virtual machine indicating that the virtual machine is a member of a pod associated with the affinity group name. Stated another way, the affinity group name serves as a pod membership attribute of the virtual machine.

When any virtual machine in pending status, the instance manager searches the records of the hosts to find a host which (1) is available for installation of a virtual machine; (2) has attributes corresponding to the host type specified for the virtual machine; and (3) meets the placement policy specified for the virtual machine. When searching for hosts to accommodate newly-specified virtual machines of a pod, or when searching for hosts to accommodate virtual machines which do not belong to a pod, the instance manager rejects hosts having a dedication attribute other than null. When searching for hosts to accommodate virtual machines of a pod after the virtual machine was temporarily uninstalled during maintenance, the instance manager rejects hosts having a dedication attribute which does not correspond to the affinity group name associated with the pod.

When the instance manager finds a host meeting these criteria, it triggers the fleet manager to change the status of the host to active, loads the software elements specified for the virtual machine into the host, and starts operation of the virtual machine. If the virtual machine belongs to a pod, the instance manager updates the dedication attribute of the host to a value corresponding to the affinity group name. If not, the dedication attribute of the host remains null. The virtual machine then operates under the control of the customer. The instance manager updates the status of the virtual machine to active, and records the identity of the host in which the virtual machine has been loaded.

Stated another way, when a pod of virtual machines is installed, a set of hosts having the virtual machines of the pod is defined, and each host of the set has a dedication attribute corresponding to the affinity group name of the pod. While the dedication attribute remains in place, the virtual machines of the pod will only be reinstalled in hosts of this set. Virtual machines which belong to a different pod, or virtual machines which do not belong to a pod, will not be installed in hosts of this set.

Figure 3:
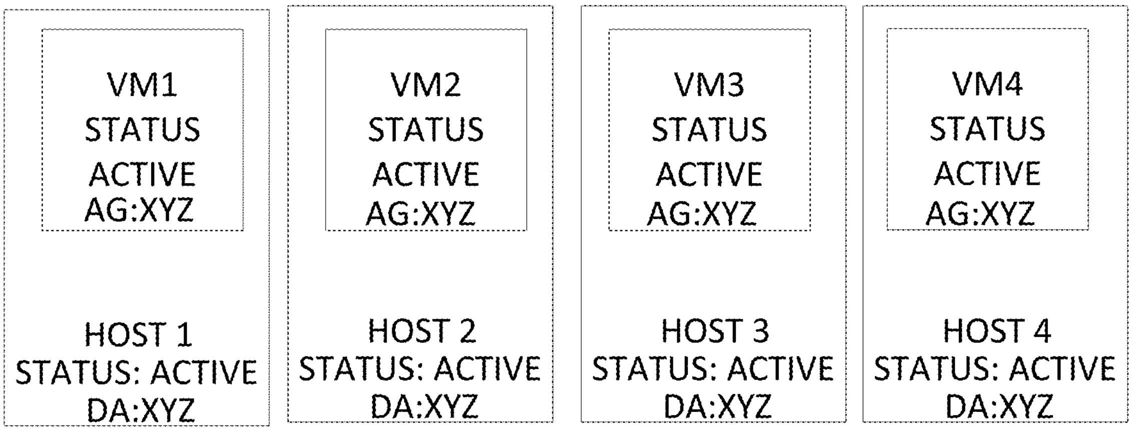
FIG. 3 is a diagrammatic representation of virtual machines and hosts in a given stage during operation of one example of the present technology.

For example, as shown in FIG. 3, a set of four hosts identified as Host 1 through Host 4 has been loaded with four virtual machines which belong to an affinity group ("AG") named XYZ, and thus having pod membership attribute XYZ. The dedication attribute ("DA") XYZ corresponding to the affinity group name has been recorded in the record for each of the hosts in the set as discussed above. In this status, the hosts and virtual machines are ACTIVE and working under the control of the customer which owns the virtual machines.

Figure 4:
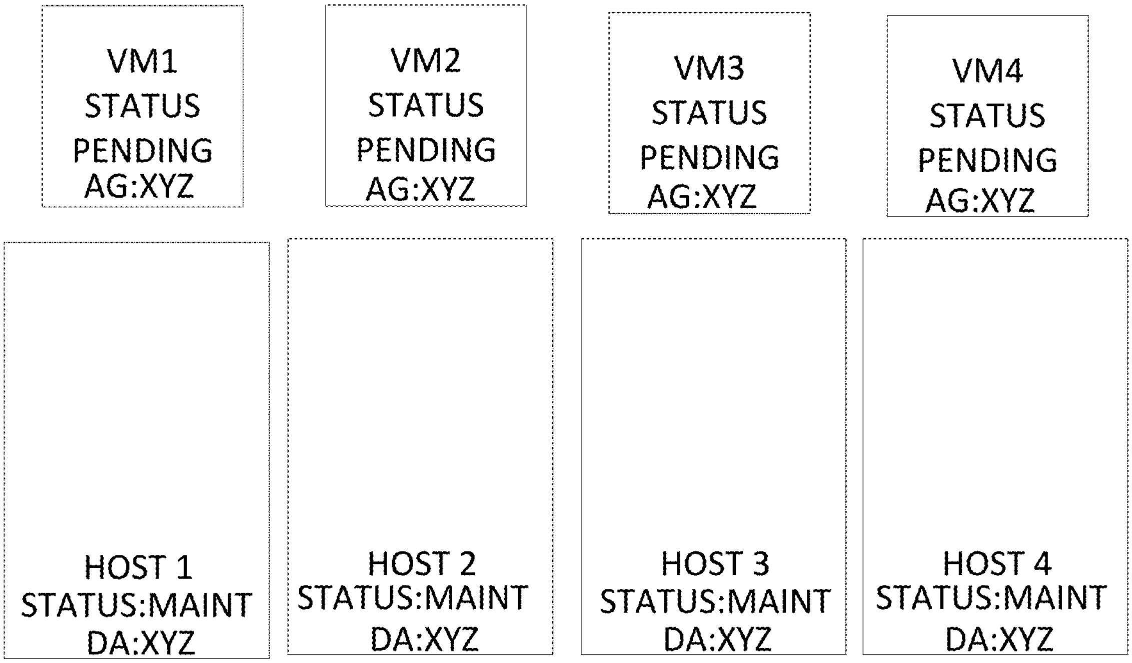
FIG. 4 is a diagrammatic representation of virtual machines and hosts in a given stage during operation of one example of the present technology.

In the condition depicted in FIG. 4, the fleet manager has initiated host maintenance for all of the hosts in the set of hosts. The fleet manager has evicted the virtual machines from the hosts of the set, as by triggering the instance manager to uninstall the virtual machines and set the status of each virtual machine to PENDING. However, the dedication attribute ("DA") remains unchanged. The fleet manager sets the status of each host in the set to indicate that the host is undergoing maintenance ("MAINT"), as also shown in FIG. 4.

Figure 5:
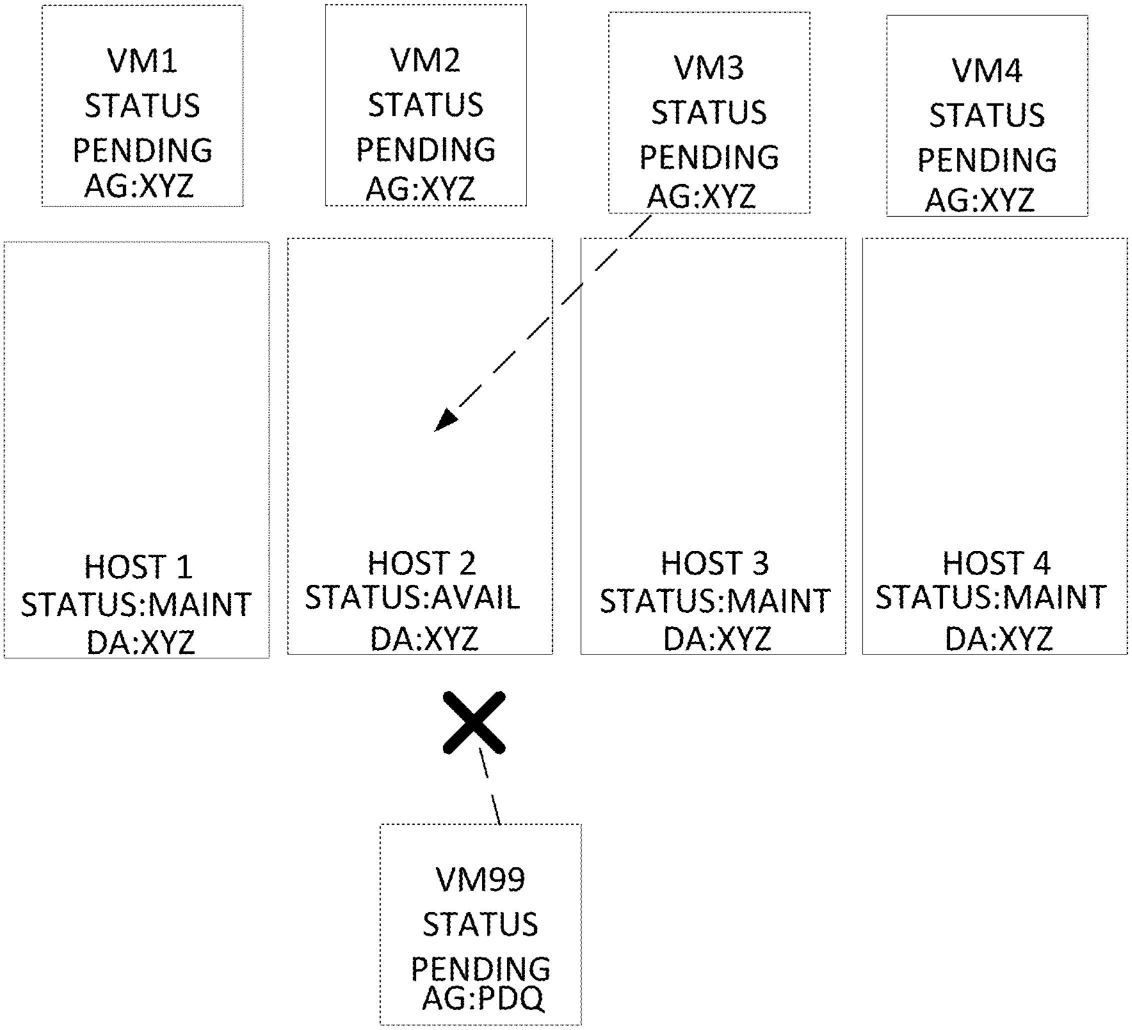
FIG. 5 is a diagrammatic representation of virtual machines and hosts in a given stage during operation of one example of the present technology.

In the condition shown in FIG. 5, the maintenance operation for Host 2 has been completed, and the fleet manager sets the status of Host 2 to available ("AVAIL") while the other hosts remain in maintenance status. The instance manager may seek to install virtual machine VM99 belonging to a different affinity group and thus having a different membership attribute ("AG:PDQ") before it seeks to install any of the virtual machines belonging to affinity group XYZ. However, virtual machine VM99 will be rejected for installation in Host 2 because the membership attribute of VM99 (affinity group name "PDQ") does not correspond to the dedication attribute XYZ of Host 2. Likewise, installation of a virtual machine which does not belong to any pod will be rejected. If the instance manager seeks to install virtual machine VM3 before seeking to install any of the other machines of the pod defined by affinity group XYZ, VM3 will be installed in Host 2, which, at this time, is the only host having the dedication attribute XYZ which is in available status. As maintenance is completed for the other hosts of the set, the other virtual machines of the pod are installed. Thus, the assignment of virtual machines within the hosts of the set will vary from time to time. However, all of the virtual machines of the pod will remain in the same set of dedicated hosts over numerous maintenance cycles.

The same is true when one or more individual virtual machines are uninstalled for virtual machine maintenance. Virtual machine maintenance may include, for example, updating of an operating system or other software component included in the VM. In this instance, the hosts which are vacated will retain their active status, and the uninstalled virtual machines will each initially have status indicating that they are temporarily uninstalled for maintenance. Each virtual machine will change to PENDING when its maintenance is done, and will be installed in a host. Here again, the dedication attribute of the hosts will remain when a virtual machine is uninstalled. Virtual machine maintenance also can occur simultaneously with host maintenance.

In the example discussed above, the dedication attribute of the host corresponds with the name of the affinity group in that they incorporate the same value, (i.e., the character string "XYZ" in FIGS. 3-5). In other examples (not shown) the dedication attribute may be a different value than the name of the affinity group, and the correspondence may be recorded in information accessible to the supervisory computer system as, for example, in a table relating each value of an affinity group name to a corresponding dedication attribute. In another variant, the dedication attribute may take the form of a list of host identifiers for the set of hosts dedicated to the pod, such list being maintained in a record accessible to the instance manager and the fleet manager. The instance manager can compile the list when initially installing the virtual machines.

Figure 6:
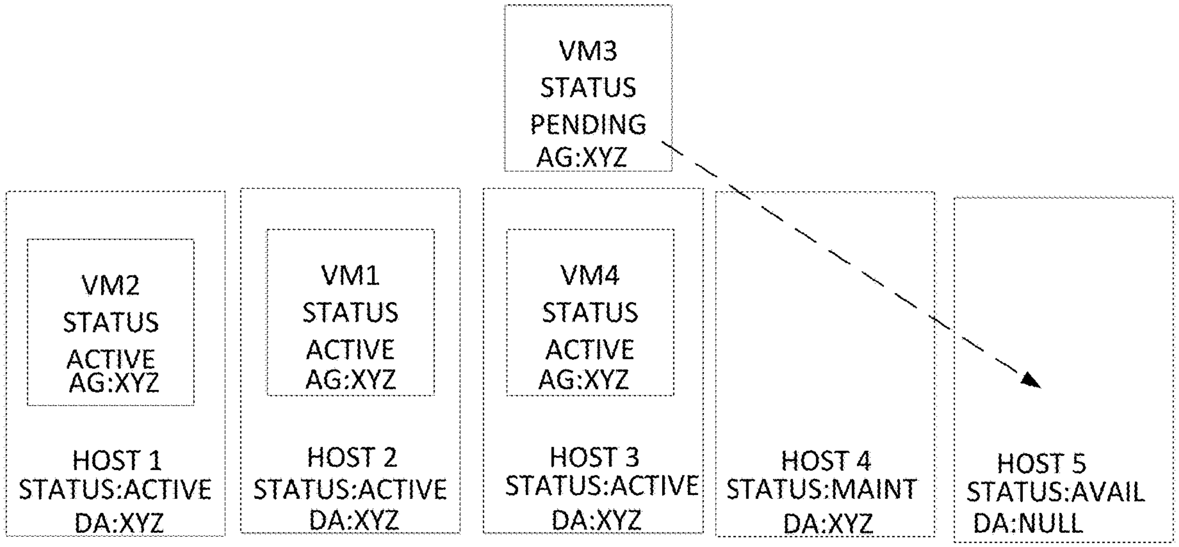
FIG. 6 is a diagrammatic representation of virtual machines and hosts in a given stage during operation of one example of the present technology.
Figure 7:
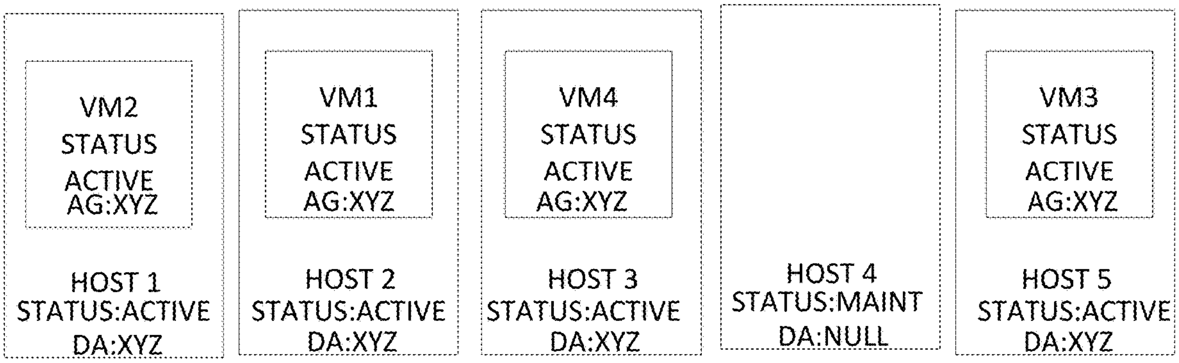
FIG. 7 is a diagrammatic representation of virtual machines and hosts in a given stage during operation of one example of the present technology.

In some instances, it may be advantageous to transfer one or more virtual machines of a pod to new hosts as part of a maintenance cycle. For example, in the condition depicted in FIG. 6, a maintenance cycle to update each of the Hosts 1-4 is almost complete. Virtual machine VM3 is in pending status, whereas the other virtual machines of the pod have returned to active status in updated Hosts 1-3. Host 4 has remained in MAINT status, indicating that the upgrade of this host is not complete. If this condition persists for a time in excess of a threshold value, the supervisory software searches for an additional host of the correct type for VM3 which is available for installation of a VM and which is not dedicated to any other pod (DA:NULL). Desirably, in this search the supervisory software also confirms that the new host has been updated to the same level as Hosts 1-3, i.e., that the maintenance performed on Hosts 1-3 has already been performed on any new host. In this example, the supervisory software has located Host 5. As depicted in FIG. 7, the supervisory software changes the dedication attribute of Host 5 to correspond to the affinity group name of the pod (DA:XYZ), so as to add Host 5 to the set of hosts dedicated to the pod, and loads VM3 to Host 5. The software also changes the dedication attribute of Host 4 to NULL, thus deleting Host 4 from the set. The same cycle of operations can be triggered by other indications that maintenance of one or more hosts in the set has failed.

The set of dedicated hosts can be modified in similar fashion if one or more virtual machines are added to the affinity group or deleted from it by the customer.

The fleet manager periodically polls or "sweeps" the record associated all of the hosts. It removes a host from the set of dedicated hosts by resetting the dedication attribute of a particular host to NULL if the host record indicates that (1) the host is not undergoing maintenance and (2) the host has been in available status, i.e., vacant and ready for installation of a virtual machine for a time greater than a predetermined reset interval. The reset interval is selected so that it is greater than the time normally required to perform virtual machine maintenance. For example, the reset interval may be a few hours or less.

In the example discussed above, the instance manager recognizes an affinity group as a defining a pod, and causes formation of a set of dedicated hosts, in response to attributes such as the virtual machine type and a compact placement policy. In other examples, the user interface may allow the customer to explicitly declare an affinity group as a pod.

In a further aspect of the present disclosure, the supervisory software schedules maintenance for one or more of selected hosts in a set of hosts running virtual machines in a pod so that at least some, and preferably all of the hosts in the set undergo a maintenance cycle in a single continuous interval, referred to herein as a "bucket interval." Desirably, at least some of the steps required to perform maintenance on a given host of the set (as, for example, reloading a host kernel or hardware maintenance steps) are performed simultaneously with at least some of the steps required to perform maintenance on one or more other hosts of the set. Desirably, virtual machine maintenance for the pod is performed simultaneously with host maintenance for the set of hosts. Maintenance can be performed on several virtual machines so that at least some of the steps required to maintain one virtual machine are performed simultaneously with one or more steps required to maintain another virtual machine of the pod. Thus, the pod is disabled for a time less than the sum of times required to perform individual host maintenance or individual virtual machines The entity operating the cloud computing system may establish a policy limiting bucket intervals for the set of hosts to occur with a minimum delay between successive maintenance bucket intervals. For example, the policy may allow maintenance bucket intervals for this set of hosts no more than once every 28 days. A similar policy may apply to software components of the virtual machines in the pod which were supplied by the cloud computing system, such as operating systems. With such a policy, the operator of the cloud computing system may provide an uptime guarantee to the customer, assuring the customer that operation of the virtual machines in the pod will operate continuously, apart from emergencies and customer-initiated actions.

Figure 8:
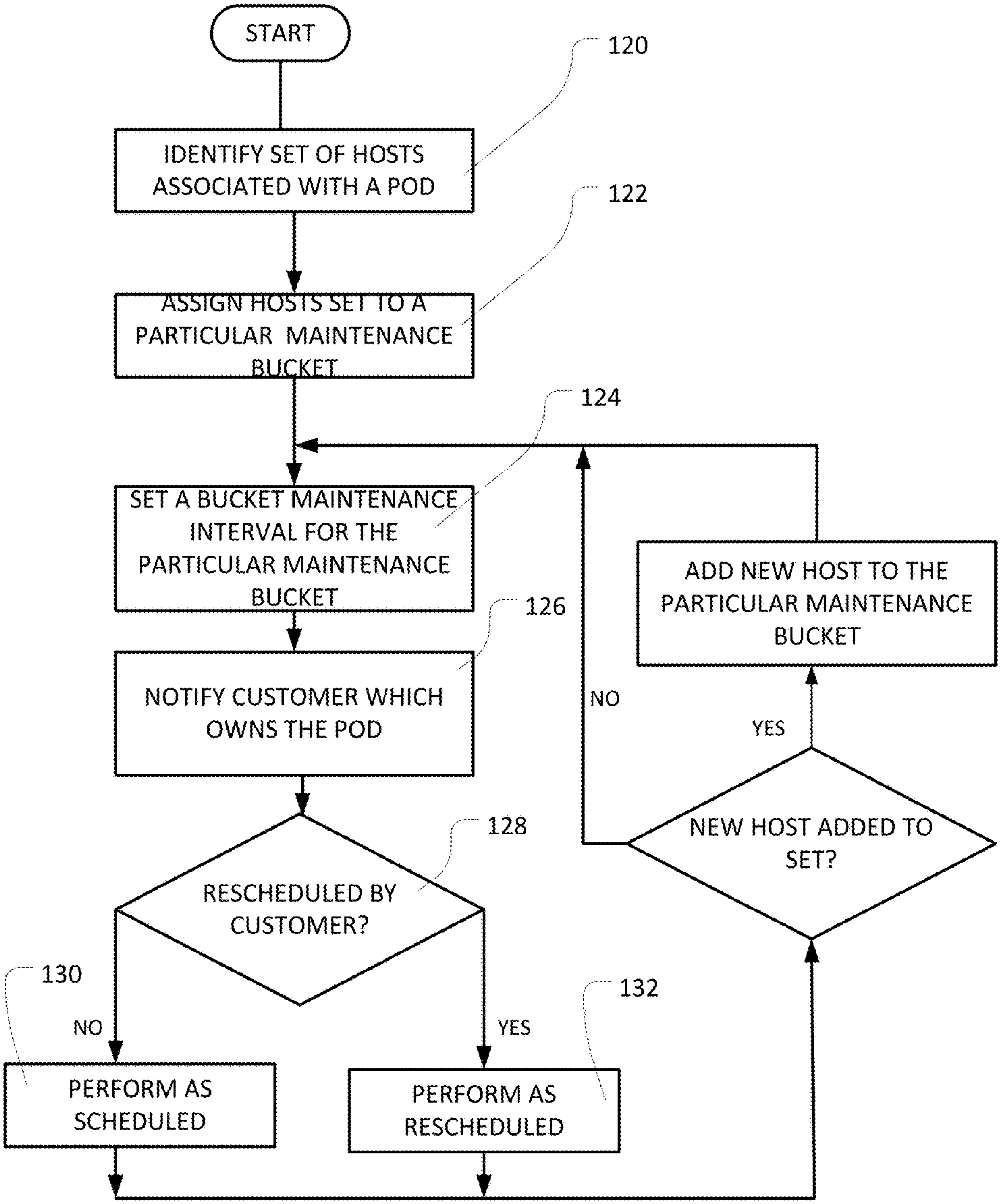
FIG. 8 is a flow chart depicting operations according to one example of the present technology.

As shown in FIG. 8, a process according to one example of this aspect begins as step 120 by using the supervisory software to identify a set of hosts associated with a pod. For example, the fleet manager may identify the hosts based on a dedication attribute as discussed above, or on information maintained by the instance manager. In step 122, the fleet manager then assigns hosts of the set, most preferably all of the hosts of the set, to a particular maintenance bucket. As used herein, the term "maintenance bucket" refers to a group of hosts which will be maintained together. The maintenance bucket desirably includes only the hosts of the set, but it may also include additional hosts not subject to a maintenance guarantee. At step 124, the fleet manager then sets a bucket interval for the maintenance bucket. A bucket interval may be selected when the cloud computing system is installing a software upgrade such as a host kernel upgrade or an upgraded hardware element in all hosts of the type used in the set. A bucket interval also may be in response to a need for virtual machine-level maintenance as, for example when an operating system forming parts of the virtual machines is to be updated. The selected bucket interval desirably is set in accordance with any uptime guarantee policy in effect. For example, if the system guarantees at least 28 days between maintenance intervals, the bucket interval will be set at least 28 days after the last maintenance. Desirably, the supervisory software may notify the customer which owns the pod (126) and allow the customer to reschedule the maintenance bucket interval (128), as further discussed below. The supervisory software then performs maintenance either during the originally scheduled interval (130) or during the rescheduled interval (132). The software returns to step 104 to set another interval when needed. However, if the customer has added a new host to the set (as by adding a further virtual machine to the pod), or if the maintenance cycle has modified the set of hosts as discussed above with reference to FIGS. 6-7, the group of hosts constituting the maintenance bucket is updated to include any new hosts.

A further feature of the disclosed technology comprises methods and systems that provides a customer with the capability to trigger host and/or VM maintenance on demand, to commence at a time selected by the customer.

At some predetermined time before a scheduled maintenance, such as a bucket interval discussed above, notifications for the upcoming maintenance are distributed to all VMs included in the pod, so as to notify the customer which owns the pod of the upcoming maintenance and the scheduled time for maintenance. For example, the notification may take the form of a POST command, which triggers the virtual machine to display the message to a human operator or monitoring system controlled by the customer. The predetermined time period may be considered the notification period. The notification desirably includes a "can_reschedule" field which indicates whether the maintenance may or may not be triggered by the customer. If the "can_reschedule" field indicates that the customer cannot reschedule the maintenance, or if the customer does not reschedule, the maintenance proceeds as originally scheduled. If the "can_reschedule" field indicates that the maintenance can be rescheduled, the customer may elect to trigger maintenance at the VM level or at a pod level, at a given time chosen by the customer. Typically, the software limits the customer's selection to only times earlier than the originally scheduled time.

In the case of VM-level triggering, maintenance is triggered for each VM within a pod on a VM-by-VM basis at a time of the customer's choosing within the notification period. This operation may take place via a VM-level API (e.g., PerformMaintenance API) implemented, for example, in supervisory computer 30. The API will return an "operation-id" in responding to the reschedule request. A maintenance status for each VM associated with the triggering request(s) may then be polled using the operation-id. If the maintenance operation is successful, the corresponding notification is deleted and the associated VM is tagged as not requiring maintenance for the predetermined time period (e.g., 28 days). If the maintenance operation fails, it may be reinitiated via the VM-level API. The customer may then wait for all the VMs for which maintenance was triggered to be completed. The maintenance performed in response to a VM-level triggering for a particular VM by the customer desirably includes whatever maintenance was included in the notification. Thus, if both VM maintenance and host maintenance were included, the maintenance will include both maintenance for the VM and host maintenance for the host in which the VM is operating. As discussed above, removing a particular VM from service can impair operation of an entire pod. However, these effects can be mitigated by the advance notification. For example, the customer can bring an individual VM to an idle state in which that VM is not working with the other VMs before the selected time for maintenance, so that the pod continues to operate during maintenance, typically with reduced performance. If the customer triggers VM-level maintenance for successive intervals, this reduced performance will persist for a time equal to the sum these intervals.

In the case of pod-level triggering, all the VMs in a pod would be triggered for maintenance during a single interval. As discussed above, this is advantageous because all VM and host maintenance can be performed in a relatively short time. This is advantageous if the customer can identify an interval when disruption of the entire pod can be tolerated. For example, a banking organization may be able to tolerate disruption of a transaction-processing pod during a day when the banks are closed. Pod-level triggering may take place via a pod-level API, which triggers maintenance for an entire pod with a single API call. In addition, the technology may be more suited for GPU pods since these pods are usually single tenant host applications. More specifically, in the case of pod-level triggering, the customer triggers maintenance for an entire pod (e.g., GPU POD) at a time of their choosing within a notification period through a pod-level API (e.g., PerformGPUPodMaintenance API either through a POST request or the gcloud CLI). The status of the maintenance may then be polled via a returned operation-id. If the maintenance operation fails, it may be reinitiated via the pod-level API. If the maintenance operation succeeds, the corresponding notifications for VMs will be deleted. Thus, in the bucketing method discussed above with reference to FIG. 8, the step process of performing maintenance (step 112) is deemed complete. After completion, the VMs are guaranteed to not see any maintenance for the time prescribed by any uptime guarantee policy.

The maintenance trigger technology typically is used with "single tenant" hosts, i.e., hosts which are occupied only by virtual machines owned by a single customer. Where some of the hosts are running virtual machines belonging to customers other than the owner of a pod, the pod owner's responses can disrupt operations of other customers' VMs. In the examples discussed above, each VM is a "whole host" VM, such that only one VM is installed in a given host. However, this is not essential; a given host may have two or more VMs of a pod installed.

Figure 9:
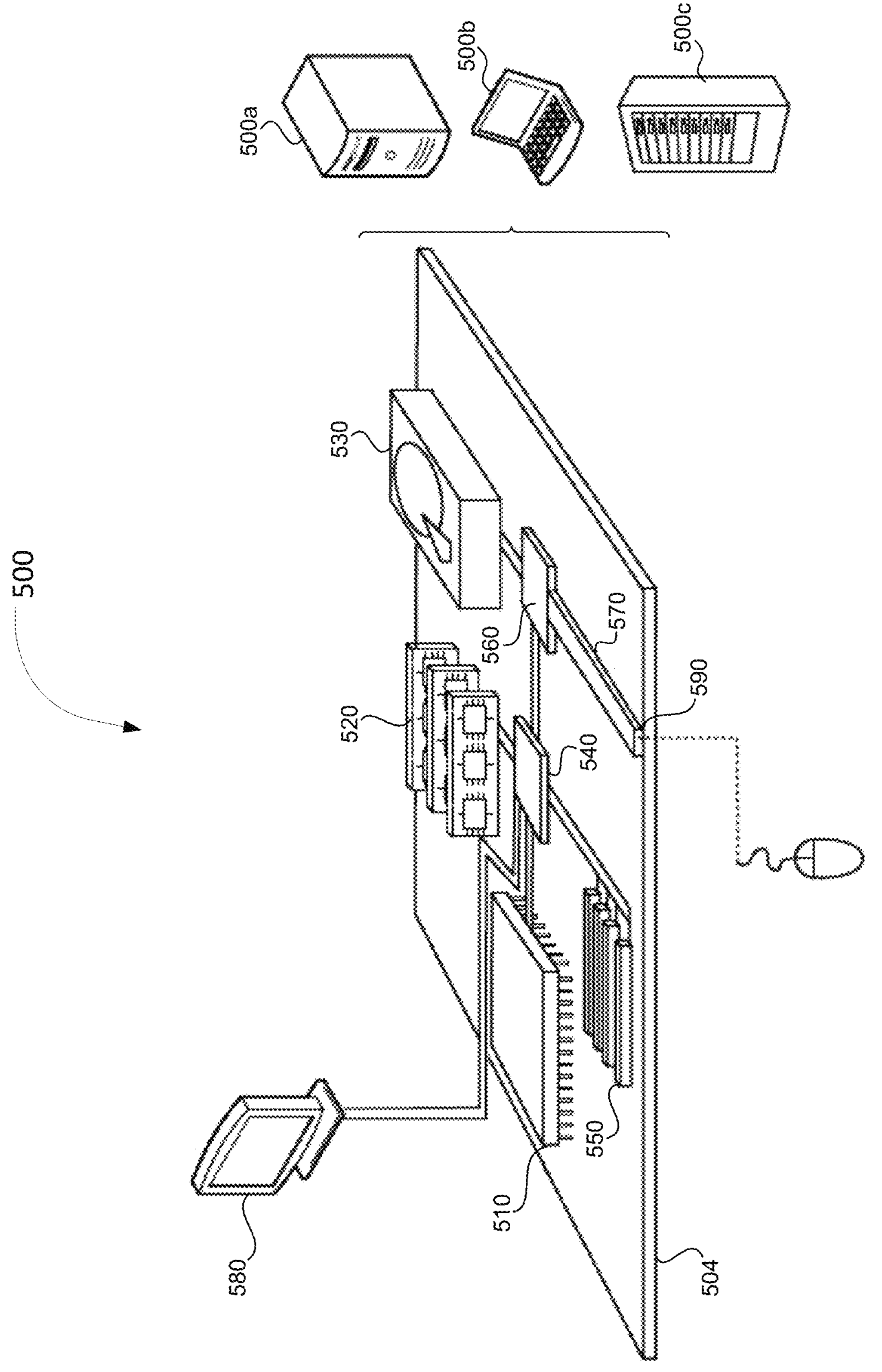
FIG. 9 is an example of a computing device in accordance with an aspect of the disclosed technology.

FIG. 9 is a schematic view of an example computing device 500 that may be used to implement the systems and methods described in this document. The computing device 500 is intended to represent various forms of digital computers, such as laptops, desktops, workstations, personal digital assistants, servers, blade servers, host machines, mainframes, and other appropriate computers. More specifically, computing device 500 may comprise supervisory computer 30. The components shown here, their connections and relationships, and their functions, are meant to be examples only, and are not meant to limit implementations of the inventions described and/or claimed in this document. For example, in the context of a server or a host machine, some of the components may reside on a system board in a chassis assembly. In addition, in some examples, the chassis assembly may include multiple such boards.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device.

Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs).

Examples of volatile memory include, but are not limited to, random access memory (RAM), dynamic random access memory (DRAM), static random access memory (SRAM), phase change memory (PCM), as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

By way of example only, the high speed controller 540 manages bandwidth-intensive operations for the computing device 500, while the low speed controller 560 manages lower bandwidth-intensive operations. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application-specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The foregoing description should be taken as illustrating, rather than as limiting, the technology as disclosed herein. More specifically, although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of operating a cloud computing system incorporating a plurality of hosts and a supervisory computer, the method comprising causing the supervisory computer to:

(a) maintain a record of virtual machines specified by customers, the virtual machines specified by the customers including a plurality of virtual machines constituting a pod, each virtual machine of the pod having a pod membership attribute denoting membership in the pod;

(b) select a set of hosts including a plurality of the hosts and install each of the virtual machines in the first pod in a host in the set so that the pod is operational;

(c) record a dedication attribute for each host in the set indicating that the host is dedicated to the pod; and, after steps (b) and (c):

(d) receive a schedule having a maintenance interval at a time period specified by a customer having ownership of the plurality of virtual machines of the pod and specifying for maintenance one or more of the plurality of virtual machines constituting the pod as determined by the customer, and initiate a maintenance interval based on the schedule and during the maintenance interval:

(1) uninstall one or more virtual machines of the pod from one or more of the hosts of the set so that one or more of the hosts in the set become vacant;

(2) while one or more of the hosts in the set are vacant and the one or more of the virtual machines of the set are uninstalled, (i) perform a maintenance operation on the vacant hosts of the set, the uninstalled virtual machines, or both; and (ii) prevent installation of any virtual machine which is not a member of the pod in any vacant host of the set by comparing a pod membership of each virtual machine proposed for installation to the dedication attribute of the host and blocking installation if the pod membership attribute of the virtual machine is null or differs from the dedication attribute of the host; and (iii) reinstall the uninstalled virtual machines in the vacated hosts of the set by selecting hosts having a dedication attribute corresponding to the pod membership attribute of the virtual machine; and wherein to initiate a maintenance interval includes operating the supervisory software to notify the customer of an impending maintenance interval before a time planned for commencement of such maintenance interval and, when the customer responds with a time earlier than the time planned, rescheduling the maintenance interval to commence at the time specified in the response.

2. The method as claimed in claim 1 further comprising causing the supervisory computer to operate the supervisory software to sort the hosts into a plurality of maintenance buckets and initiate maintenance intervals for all of the hosts in a given bucket within a bucket interval associated with that bucket, the sorting step including assigning all of the hosts of the set to a single maintenance bucket.

3. The method as claimed in claim 1 wherein the virtual machines of the pod are Graphics Processing Unit ("GPU") machines and share data with one another via remote direct memory access.

4. The method as claimed in claim 1 wherein no virtual machines other than the virtual machines of the pod are installed in the hosts of the set.

5. The method as claimed in claim 1 wherein, in step (a) the virtual machines include virtual machines in a plurality of pods, and virtual machines in different ones of the pods have different membership attributes, and wherein steps (b)-(d) are performed separately for different ones of the pods, so that as to form plural sets of hosts, the hosts of each set having a dedication attribute corresponding to the membership attribute of one of the pods.

6. A non-transitory computer-readable medium storing a program including instructions that, when executed by one or more processing devices, causes a supervisory computer to:

(a) maintain a record of virtual machines specified by customers, the virtual machines specified by the customers including a plurality of virtual machines constituting a pod, each virtual machine of the pod having a pod membership attribute denoting membership in the pod;

(b) select a set of hosts including a plurality of the hosts and install each of the virtual machines in the first pod in a host in the set so that the pod is operational;

(c) record a dedication attribute for each host in the set indicating that the host is dedicated to the pod; and, after steps (b) and (c):

(d) receive a schedule having a maintenance interval at a time period specified by a customer having ownership of the plurality of virtual machines of the pod and specifying for maintenance one or more of the plurality of virtual machines constituting the pod as determined by the customer, and initiate a maintenance interval based on the schedule and during the maintenance interval:

(1) uninstall one or more virtual machines of the pod from one or more of the hosts of the set so that one or more of the hosts in the set become vacant;

(2) while one or more of the hosts in the set are vacant and one or more of the virtual machines of the set are uninstalled, (i) perform a maintenance operation on the vacant hosts of the set, the uninstalled virtual machines, or both; and (ii) prevent installation of any virtual machine which is not a member of the pod in any vacant host of the set by comparing a pod membership of each virtual machine proposed for installation to the dedication attribute of the host and blocking installation if the pod membership attribute of the virtual machine is null or differs from the dedication attribute of the host; and (iii) reinstall the uninstalled virtual machines in the vacated hosts of the set by selecting hosts having a dedication attribute corresponding to the pod membership attribute of the virtual machine; and wherein to initiate a maintenance interval includes operating the supervisory software to notify the customer of an impending maintenance interval before a time planned for commencement of such maintenance interval and, when the customer responds with a time earlier than the time planned, rescheduling the maintenance interval to commence at the time specified in the response.

7. The non-transitory computer-readable medium as claimed in claim 6 further comprising causing the supervisory computer to operate the supervisory software to sort the hosts into a plurality of maintenance buckets and initiate maintenance intervals for all of the hosts in a given bucket within a bucket interval associated with that bucket, the sorting step including assigning all of the hosts of the set to a single maintenance bucket.

8. The non-transitory computer-readable medium as claimed in claim 6 wherein the virtual machines of the pod are Graphics Processing Unit ("GPU") machines and share data with one another via remote direct memory access.

9. The non-transitory computer-readable medium as claimed in claim 6 wherein no virtual machines other than the virtual machines of the pod are installed in the hosts of the set.

10. The non-transitory computer-readable medium as claimed in claim 6 wherein, in step (a) the virtual machines include virtual machines in a plurality of pods, and virtual machines in different ones of the pods have different membership attributes, and wherein steps (b)-(d) are performed separately for different ones of the pods, so that as to form plural sets of hosts, the hosts of each set having a dedication attribute corresponding to the membership attribute of one of the pods.

* * * * *